(12) United States Patent
Weller (10) Patent No.: US 11,720,752 B2
(45) Date of Patent: Aug. 8, 2023

(54) MACHINE LEARNING ENABLED TEXT ANALYSIS WITH MULTI-LANGUAGE SUPPORT

(71) Applicant: SAP SE, Walldorf (DE)

(72) Inventor: Tobias Weller, Buseck (DE)

(73) Assignee: SAP SE, Walldorf (DE)

( * ) Notice: Subject to any disclaimer, the term of this patent is extended or adjusted under 35 U.S.C. 154(b) by 334 days.

(21) Appl. No.: 16/922,922

(22) Filed: Jul. 7, 2020

(65) Prior Publication Data
US 2022/0012429 A1  Jan. 13, 2022

(51) Int. Cl.
G06F 40/263 (2020.01)
G06F 40/279 (2020.01)
G06F 40/295 (2020.01)
G06N 20/20 (2019.01)
G06N 3/02 (2006.01)
G06N 20/10 (2019.01)
G06F 18/214 (2023.01)

(52) U.S. Cl.
CPC ........ G06F 40/295 (2020.01); G06F 18/2148 (2023.01); G06N 3/02 (2013.01); G06N 20/10 (2019.01); G06N 20/20 (2019.01)

(58) Field of Classification Search
CPC ...... G06F 40/295; G06F 40/284; G06F 40/30; G06F 16/243; G06F 40/00; G06F 40/279; G06F 40/289; G06F 40/40; G06F 40/55; G06N 20/00; G06N 3/08; G06N 3/02
See application file for complete search history.

(56) References Cited

U.S. PATENT DOCUMENTS

| | | | |
|---|---|---|---|
| 6,047,251 A * | 4/2000 | Pon | G06V 30/242 382/229 |
| 2004/0078191 A1* | 4/2004 | Tian | G06F 40/263 704/9 |
| 2007/0009151 A1* | 1/2007 | Pittman | G06V 30/373 382/159 |
| 2016/0110340 A1* | 4/2016 | Bojja | G06F 40/263 704/9 |
| 2019/0155924 A1* | 5/2019 | Guggilla | G06N 20/20 |
| 2019/0205463 A1* | 7/2019 | Santhanam | G06F 40/295 |
| 2019/0311194 A1* | 10/2019 | Zhuravlev | G06F 18/285 |
| 2020/0065476 A1* | 2/2020 | Boutnaru | G06F 21/46 |

(Continued)

*Primary Examiner* — Olujimi A Adesanya
(74) *Attorney, Agent, or Firm* — Mintz Levin Cohn Ferris Glovsky and Popeo, P.C.

(57) ABSTRACT

A language determination model may be applied to select a first machine learning model or a second machine learning model to analyze the input text. The first machine learning model trained to analyze text in a first language, the second machine learning model trained to analyze text in a second language, and the input text may be in a third language. The language determination model may select the first machine learning model based on the first machine learning model having a better performance analyzing text in the third language than the second machine learning model. The language determination model may be updated based on an actual performance of the first machine learning model analyzing the input text. Moreover, the first machine learning model may be subject to additional training if the actual performance of the first machine learning model analyzing the input text is below a threshold value.

16 Claims, 5 Drawing Sheets

(56) References Cited

U.S. PATENT DOCUMENTS

| | | | |
|---|---|---|---|
| 2020/0089771 A1* | 3/2020 | Trabelsi | G06N 5/022 |
| 2020/0097539 A1* | 3/2020 | Katz | G06F 40/242 |
| 2020/0151591 A1* | 5/2020 | Li | G06N 3/08 |
| 2020/0327196 A1* | 10/2020 | Sampat | G06N 20/00 |
| 2021/0089961 A1* | 3/2021 | Zeise | G06N 20/00 |
| 2021/0157975 A1* | 5/2021 | Gelosi | G06V 30/416 |
| 2021/0390951 A1* | 12/2021 | Gadde | G06F 40/30 |

* cited by examiner

MACHINE LEARNING ENABLED TEXT ANALYSIS WITH MULTI-LANGUAGE SUPPORT

FIELD

The present disclosure generally relates to machine learning and more specifically to multi-language support for machine learning enabled text analysis.

BACKGROUND

Machine learning models may be trained to perform a variety of text analysis tasks. For example, a machine learning model trained to perform named-entity recognition (NER) may assign each named entity present in unstructured text to a predefined category such as person names, organizations, locations, medical codes, time expressions, quantities, monetary values, percentages, and/or the like. Training the machine learning model to perform a text analysis task may include adjusting the machine learning model to minimize the errors present in the output of the machine learning model. For instance, training the machine learning model to perform named-entity recognition may include adjusting the weights applied by the machine learning model in order to minimize a quantity of incorrect categories assigned by the machine learning model.

SUMMARY

Methods, systems, and articles of manufacture, including computer program products, are provided for machine learning enabled text analysis with multi-language support. In one aspect, there is provided a system. The system may include at least one data processor and at least one memory. The at least one memory may store instructions that result in operations when executed by the at least one data processor. The operations may include: applying a language determination model to select, based at least on a language of an input text, a first machine learning model or a second machine learning model to analyze the input text, the first machine learning model trained to analyze text in a first language, and the second machine learning model trained to analyze text in a second language; and analyze the input text by at least applying, to the input text, the first machine leaning model or the second machine learning model selected by the language determination model.

In some variations, one or more of the features disclosed herein including the following features can optionally be included in any feasible combination. The language determination model may be trained based at least on a training data. The training data may include a first performance of the first machine learning model analyzing text in the first language, the second language, and/or a third language. The training data may further include a second performance of the second machine learning model analyzing text in the first language, the second language, and/or the third language.

In some variations, the training data may further include a family, a branch, a sub-branch, and/or a script associated with each of the first language, the second language, and the third language.

In some variations, each of the first performance and the second performance may correspond to a quantity of named entities assigned to a correct category.

In some variations, the input text may be in the third language. The language determination model may select, based at least on the first machine learning model having a better performance analyzing text in the third language than the second machine learning model, the first machine learning model to analyze the input text.

In some variations, the language determination model may be updated based at least on a third performance of the first machine learning analyzing the input text.

In some variations, in response to the third performance of the first machine learning model analyzing the input text being below a threshold value, the first machine learning model may be trained based on additional training data in the first language.

In some variations, the language determination model may be further trained to select, based at least on a type of the input text, the first machine learning model or the second machine learning model to analyze the input text.

In some variations, the first machine learning model, the second machine learning model, and the language determination model may each include a support vector machine, a boosted decision tree, a regularized logistic regression model, a neural network, and/or a random forest.

In some variations, the analysis of the input text may include assigning each named entity present in the input text to one or more categories including a person name, an organizations, a location, a medical code, a time expression, a quantity, a monetary value, and a percentage.

In another aspect, there is provided a method for machine learning enabled text analysis with multi-language support. The method may include: applying a language determination model to select, based at least on a language of an input text, a first machine learning model or a second machine learning model to analyze the input text, the first machine learning model trained to analyze text in a first language, and the second machine learning model trained to analyze text in a second language; and analyze the input text by at least applying, to the input text, the first machine leaning model or the second machine learning model selected by the language determination model.

In some variations, one or more of the features disclosed herein including the following features can optionally be included in any feasible combination. The method may further include training, based at least on a training data, the language determination model. The training data may include a first performance of the first machine learning model analyzing text in the first language, the second language, and/or a third language. The training data may further include a second performance of the second machine learning model analyzing text in the first language, the second language, and/or the third language.

In some variations, the training data may further include a family, a branch, a sub-branch, and/or a script associated with each of the first language, the second language, and the third language.

In some variations, each of the first performance and the second performance may correspond to a quantity of named entities assigned to a correct category.

In some variations, the input text may be in the third language. The language determination model may select, based at least on the first machine learning model having a better performance analyzing text in the third language than the second machine learning model, the first machine learning model to analyze the input text.

In some variations, the method may further include updating, based at least on a third performance of the first machine learning analyzing the input text, the language determination model.

In some variations, the method may further include in response to a third performance of the first machine learning model analyzing the input text being below a threshold value, training, based on additional training data in the first language, the first machine learning model.

In some variations, the language determination model may be further trained to select, based at least on a type of the input text, the first machine learning model or the second machine learning model to analyze the input text.

In some variations, the first machine learning model, the second machine learning model, and the language determination model may each include a support vector machine, a boosted decision tree, a regularized logistic regression model, a neural network, and/or a random forest.

In another aspect, there is provided a computer program product that includes a non-transitory computer readable storage medium. The non-transitory computer-readable storage medium may include program code that causes operations when executed by at least one data processor. The operations may include: applying a language determination model to select, based at least on a language of an input text, a first machine learning model or a second machine learning model to analyze the input text, the first machine learning model trained to analyze text in a first language, and the second machine learning model trained to analyze text in a second language; and analyze the input text by at least applying, to the input text, the first machine leaning model or the second machine learning model selected by the language determination model.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to providing multi-language support for machine learning enabled text analysis, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar items in the drawings.

DETAILED DESCRIPTION

A machine learning model may be trained to perform a text analysis task such as named-entity recognition (NER) by at least subjecting the machine learning model to supervised learning. Supervised learning may require labeled corpus, which may include training samples as well as validation samples of text associated with at least one ground-truth label that correspond to a correct label for the text. Training the machine learning model may thus include minimizing an error in an output of the machine learning model, which may correspond to a difference between the labels the machine learning model assigns to a training sample and the ground-truth label associated with the training sample. Moreover, the performance of the machine learning model may be validated based on whether the machine learning model is able to assign a correct label to more than a threshold quantity of validation samples.

For text analysis tasks such as named-entity recognition (NER), the performance of the machine learning model may be contingent upon the language distribution of the training samples. For example, a machine learning model trained using training samples in a first language may perform well when analyzing text in the first language but underperform when analyzing text in a second language. Language-specific machine learning models may therefore be unsuitable for applications that require analysis of text in multiple languages. Training and maintaining multiple language-specific machine learning models may consume excessive resources as each language-specific machine learning model may require a large quantity of training samples. Meanwhile, a multi-language machine learning model trained using training samples in multiple languages may perform sub-optimally across all languages.

As such, in some example embodiments, a machine learning enabled multi-language text analysis engine may include multiple language-specific machine learning models including, for example, a first machine learning model trained to analyze text in a first language and a second machine learning model trained to analyze text in a second language. Furthermore, the machine learning enabled multi-language text analysis engine may include a language determination model trained to select, based at least on the language of an input text, one of the language specific machine learning models to analyze the input text.

In some example embodiments, the language determination model may be trained based on training data that includes a performance of each language-specific machine learning model analyzing text in a variety of languages, including languages that the language-specific machine learning models are not trained to analyze. The performance of a language-specific machine learning model analyzing text in a certain language may correspond to an accuracy of the analysis including, for example, a quantity (e.g., percentage, ratio, and/or the like) of named entity present in the text that the language-specific machine learning model is able to assign to a correct category (e.g., person names, organizations, locations, medical codes, time expressions, quantities, monetary values, percentages, and/or the like).

For example, the training data for training the language determination model may include the performance of the first machine learning model and the second machine learning model analyzing text in the first language, text in the second language, and text in a third language. Moreover, the language determination model may be updated based on the actual performance of the language-specific machine learning model selected to analyze the input text. For instance, if the first machine learning model, which may be trained to analyze text in the first language, is selected to analyze input text in the same first language or a different language, the language determination model may be updated based on the performance of the first machine learning model analyzing the input text in the fourth language.

In some example embodiments, the training data for training the language determination model may further include one or more attributes of the text being analyzed by each of the language-specific machine learning models. For example, in addition to the performance of the first machine learning model and the second machine learning model analyzing text in various languages, the training data may be extended to include a type of the text (e.g., news article, contract, academic paper, and/or the like) such that the language determination model may be further trained to recognize a nexus between the performance of a language-specific machine learning model and the type of text in different languages. As such, the language determination model may select one of the language specific machine learning models to analyze the input text based on the language of the input text as well as the type of the input text.

Figure 1:
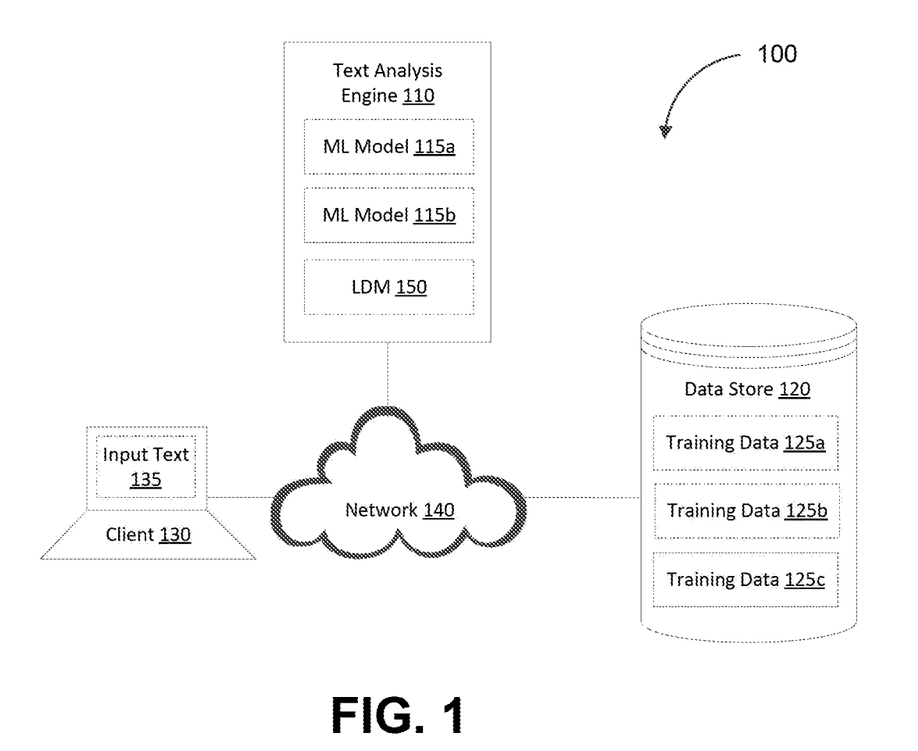
FIG. 1 depicts a system diagram illustrating an example of a machine learning enabled text analysis system, in accordance with some example embodiments.

FIG. 1 depicts a system diagram illustrating an example of a machine learning enabled text analysis system 100, in accordance with some example embodiments. Referring to FIG. 1, the machine learning enabled text analysis system 100 may include a text analysis engine 110, a data store 120, and a client 130. As shown in FIG. 1, the text analysis engine 110, the data store 120, and the client 103 may be communicatively coupled via a network 140. The data store 120 may be a repository for electronic data including, for example, a relational database, an object oriented database, a non-relational database, and/or the like. The client 130 may be a processor-based device including, for example, a smartphone, a computer, a tablet, a wearable apparatus, a virtual assistant, an Internet-of-Things (IoT) appliance, and/or the like. The network 140 may be a wired network and/or a wireless network including, for example, a wide area network (WAN), a local area network (LAN), a virtual local area network (VLAN), a public land mobile network (PLMN), the Internet, and/or the like.

The text analysis engine 110 may include multiple language specific machine learning models, each of which trained to analyze text in a specific language. For example, as shown in FIG. 1, the text analysis engine 110 may include a first machine learning model 115a trained, based on a first training data 125a in a first language, to analyze text in the first language. Furthermore, the text analysis engine 110 may include a second machine learning model 115b trained, based on a second training data 125b in a second language, to analyze text in the second language. As shown in FIG. 1, the first training data 125a and the second training data 125b may be stored in the data store 120.

In some example embodiments, the text analysis engine 110 may also include a language determination model (LDM) 150, which may be a machine learning model trained to select one of the language specific machine learning models to analyze an input text 135 received from the client 130. It should be appreciated that each of the first machine learning model 115a, the second machine learning model 125b, and the language determination model 150 may be implemented using a variety of machine learning models including, for example, support vector machines, boosted decision trees, regularized logistic regression models, neural networks, random forests, and/or the like.

The language determination model 150 may be trained based on a third training data 125c from the data store 120, which may include a performance of each of the language-specific machine learning models analyzing text in a variety of different languages including languages that the language-specific machine learning models are not trained to analyze. For example, the third training data 125c may include a performance of each of the first machine learning model 115a and the second machine learning model 115b analyzing text in a variety of language including, for example, the first language, the second language, and a third language. Although the first machine learning model 115a and the second machine learning model 115b have not been trained to analyze text in the third language, the first machine learning model 115a and/or the second machine learning model 115b may nevertheless be capable of analyzing text in the third language due to similarities between the first language, the second language, and the third language. Moreover, the third training data 125c may include a type of the text (e.g., news article, contract, academic paper, and/or the like) such that the language determination model 150 may be further trained to recognize a nexus between the performance of each language-specific machine learning model and the type of text in different languages.

As noted, the language determination model 150 may be trained to select one of the language specific machine learning models to analyze the input text 135 received from the client 130. For example, the language determination model 150 may select, based at least on the language and/or type of the input text 135, the first machine learning model 115a or the second machine learning model 115b to analyze the input text 135. In some example embodiments, the language determination model 150 may be updated based on the actual performance of the language-specific machine learning model selected to analyze the input text 135. Moreover, the language determination model 150 may monitor the performance of each language-specific machine learning model in order to identify underperforming machine learning models that require additional training. For instance, if the first machine learning model 115a, which may be trained to analyze text in the first language, is selected to analyze the input text 135 in the same first language or a different language, the language determination model 150 may be updated based on the performance of the first machine learning model 115a analyzing the input text 135. In instances where the performance of the first machine learning model 115a analyzing text in the first language remains below a threshold value, the language determination model 150 may determine that the first machine learning model 115a requires additional training, for example, with additional training data in the first language.

In some example embodiments, the type of machine learning model used to implement the language determination model 150 may be determined based the complexity of the input text 135. For example, the language determination model 150 may be an ensemble learning model such as, for example, a random forest, a gradient boosting machine, and/or the like. Where the input text 135 is associated with additional information such as language family, branches, and script, the language determination model 150 may be trained to generalize and select, for example, the first machine learning model 115a to analyze the input text 135 even though the first machine learning model 115a was trained to analyze text in a different language than the input text 135. For instance, the language determination model 150 may be trained to learn that West Germanic languages may work best on a model trained on German data while Cyrillic script languages may work best on a model trained on Russian data.

Figure 2:
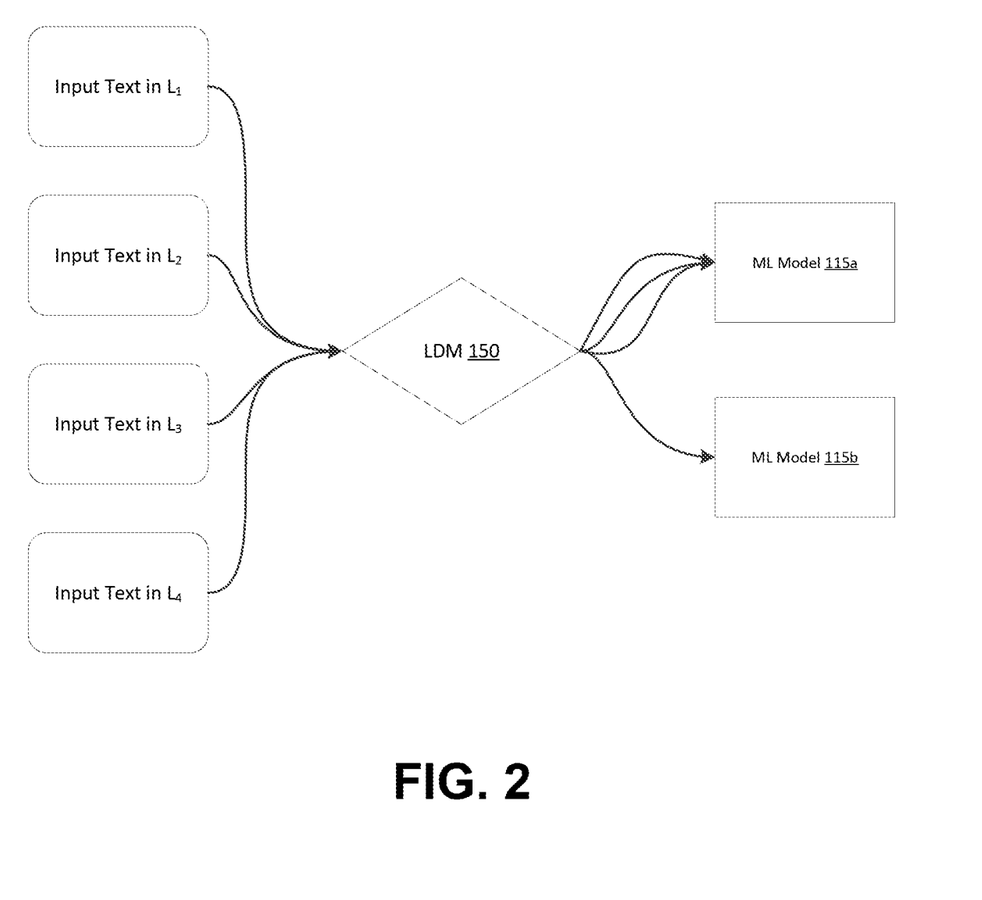
FIG. 2 depicts a flow diagram illustrating the operations of an example of a language determination model, in accordance with some example embodiments.

To further illustrate, FIG. 2 depicts a flow diagram illustrating the operations of an example of the language determination model 150, in accordance with some example embodiments. As noted, the language determination model 150 may be trained to select, based at least on the language of the input text 135, the first machine learning model 115a or the second machine learning model 115b to analyze the input text 135. In the example shown in FIG. 2, the language determination model 150 may select the first machine learning model 115a to analyze the input text 135 if the input text 135 is in a first language $L_1$, a second language $L_2$, or a fourth language $L_4$. Moreover, the language determination model 150 may select the second machine learning model 115b to analyze the input text 135 if the input text 135 is in a third language $L_3$.

In some example embodiments, the language determination model 150 may be trained based on the third training data 125c, which may include a performance of each of the first machine learning model 115a and the second machine learning model 115b analyzing text in a variety of language including, for example, the first language $L_1$, the second language $L_2$, the third language $L_3$, and/or the fourth language $L_4$. In addition to being trained based on the third training data 125c, the language determination model 150 may also be updated based on an actual performance of the first machine learning model 115a and the second machine learning model analyzing input text in the first language $L_1$, the second language $L_2$, the third language $L_3$, and/or the fourth language $L_4$.

To further illustrate, Table 1 below depicts examples of training samples included, for example, in the third training data 125c. As shown in Table 1, each training sample may include a language, a family associated with the language, a branch associated with the language, a sub-branch associated with the language, a script associated with the language, the language of the training data used to train a machine learning model, and an accuracy of the machine learning model analyzing input text in the language.

TABLE 1

| Training Sample 1: |
| --- |
| Language: German |
| Family: Indo-European |
| Branch: Germanic |
| Subbranch: West Germanic |
| Script: Latin |
| Model Language: English |
| Accuracy: 0.9 |
| Training Sample 2: |
| Language: German |
| Family: Indo-European |
| Branch: Germanic |
| Subbranch: West Germanic |
| Model Language: Chinese |
| Accuracy: 0.6 |
| Training Sample 3: |
| Language: German |
| Family: Indo-European |
| Branch: Germanic |
| Subbranch: West Germanic |
| Model Language: German |
| Accuracy: 0.95 |

Figure 3:
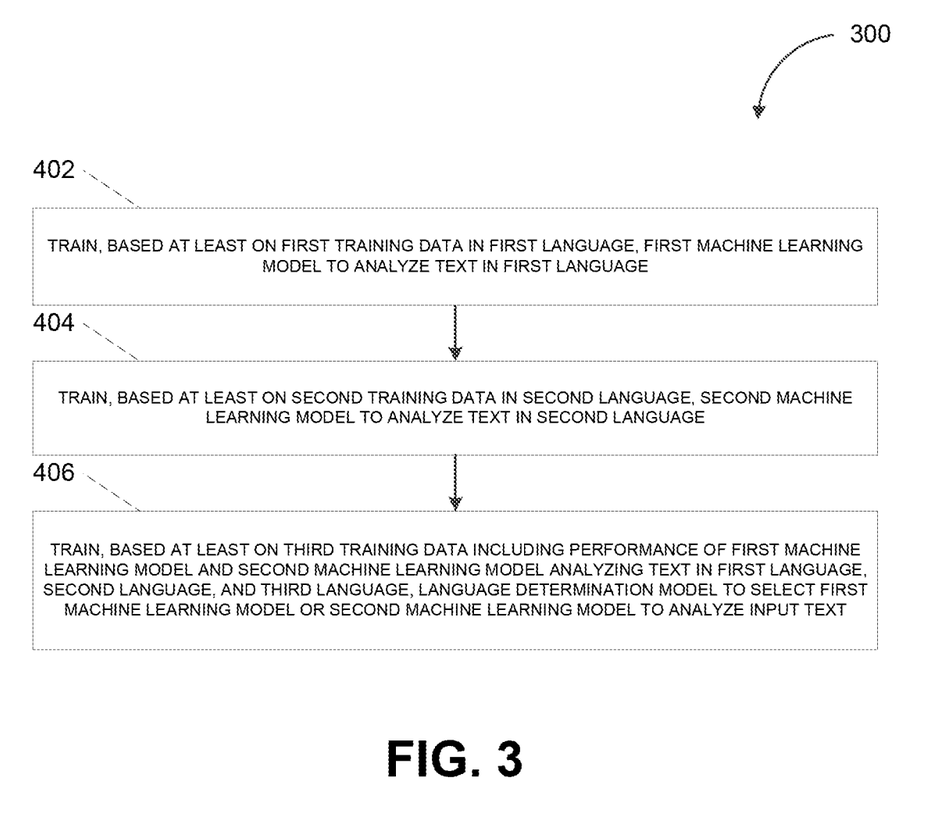
FIG. 3 depicts a flowchart illustrating an example of a process for training a machine learning model to provide multi-language support for text analysis, in accordance with some example embodiments.

FIG. 3 depicts a flowchart illustrating an example of a process 400 for training a machine learning model to provide multi-language support for text analysis, in accordance with some example embodiments. Referring to FIGS. 1 and 3, the process 300 may be performed by the text analysis engine 110.

At 302, the text analysis engine 110 may train, based at least on a first training data in a first language, the first machine learning model 115a to analyze text in the first language. For example, the first machine learning model 115a may be trained, based at least on the first training data 125a in the first language, to analyze text in the first language.

At 304, the text analysis engine 110 may train, based at least on a second training data in a first language, the first machine learning model 115a to analyze text in the first language. For example, the second machine learning model 115b may be trained, based at least on the second training data 125b in the second language, to analyze text in the second language.

At 306, the text analysis engine 110 may train, based at least on a third training data including a performance of the first machine learning model 115a and the second machine learning model 115b analyzing text in the first language, the second language, and a third language, the language determination model 150 to select the first machine learning model 115a or the second machine learning model 115b to analyze input text. For example, the third training data 125c may include a performance of each of the first machine learning model 115a and the second machine learning model 115b analyzing text in a variety of language including, for example, the first language, the second language, and a third language. Although the first machine learning model 115a and the second machine learning model 115b have not been trained to analyze text in the third language, the first machine learning model 115a and/or the second machine learning model 115b may nevertheless be capable of analyzing text in the third language due to similarities between the first language, the second language, and the third language. In some example embodiments, the third training data 125c may include a type of the text (e.g., news article, contract, academic paper, and/or the like) such that the language determination model 150 may be further trained to recognize a nexus between the performance of each of the first machine learning model 115a and the second machine learning model 115b and the type of text in different languages.

Figure 4:
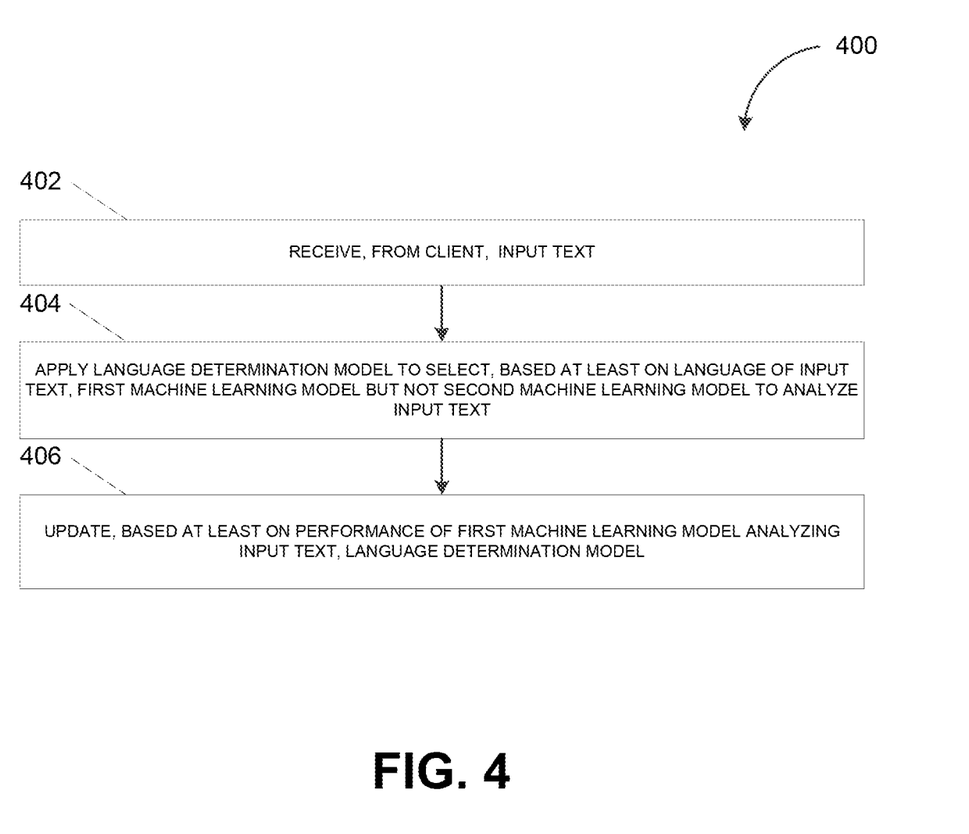
FIG. 4 depicts a flowchart illustrating an example of a process for machine learning enabled text analysis with multi-language support, in accordance with some example embodiments.

FIG. 4 depicts a flowchart illustrating an example of a process 400 for machine learning enabled text analysis with multi-language support, in accordance with some example embodiments. Referring to FIGS. 1 and 4, the process 400 may be performed by the text analysis engine 110.

At 402, the text analysis engine 110 may receive, from the client 130, the input text 135. For example, the input text 135 may be in a variety of languages, including languages that the first machine learning model 115a and the second machine learning model 115b have been trained to analyze as well as languages that the first machine learning model 115a and the second machine learning model 115b have not been trained to analyze.

At 404, the text analysis engine 110 may apply the language determination model 150 to select, based at least on the language of the input text 135, the first machine learning model 115a but not the second machine learning model 115b to analyze the input text 135. For example, the language determination model 150 may select the first machine learning model 115a to analyze the input text 135 based on the performance of the first machine learning model 115a analyzing text in the language of the input text 135. Furthermore, in some example embodiments, the language determination model 150 may select the first machine learning model 115a to analyze the input text 135 based on the performance of the first machine learning model 115a analyzing type of text (e.g., news article, contract, academic paper, and/or the like) associated with the input text 135. The language determination model 150 may select the first machine learning model 115a and not the second machine learning model 115b based on the first machine learning model 115a having a better performance than the second machine learning model 115b when analyzing the language and/or the type of the input text 135.

At 406, the text analysis engine 110 may update, based at least on the performance of the first machine learning model 115a analyzing the input text 135, the language determination model 150. In some example embodiments, the language determination model 150 may be updated based on the actual performance of the first machine learning model 115a analyzing the input text 135. Moreover, the language determination model 150 may monitor the performance of each language-specific machine learning model in order to identify underperforming machine learning models that require additional training. As such, where the performance of the first machine learning model 115a analyzing text in the first language remains below a threshold value, the language determination model 150 may determine that the first machine learning model 115a requires additional training, for example, with additional training data in the first language.

Figure 5:
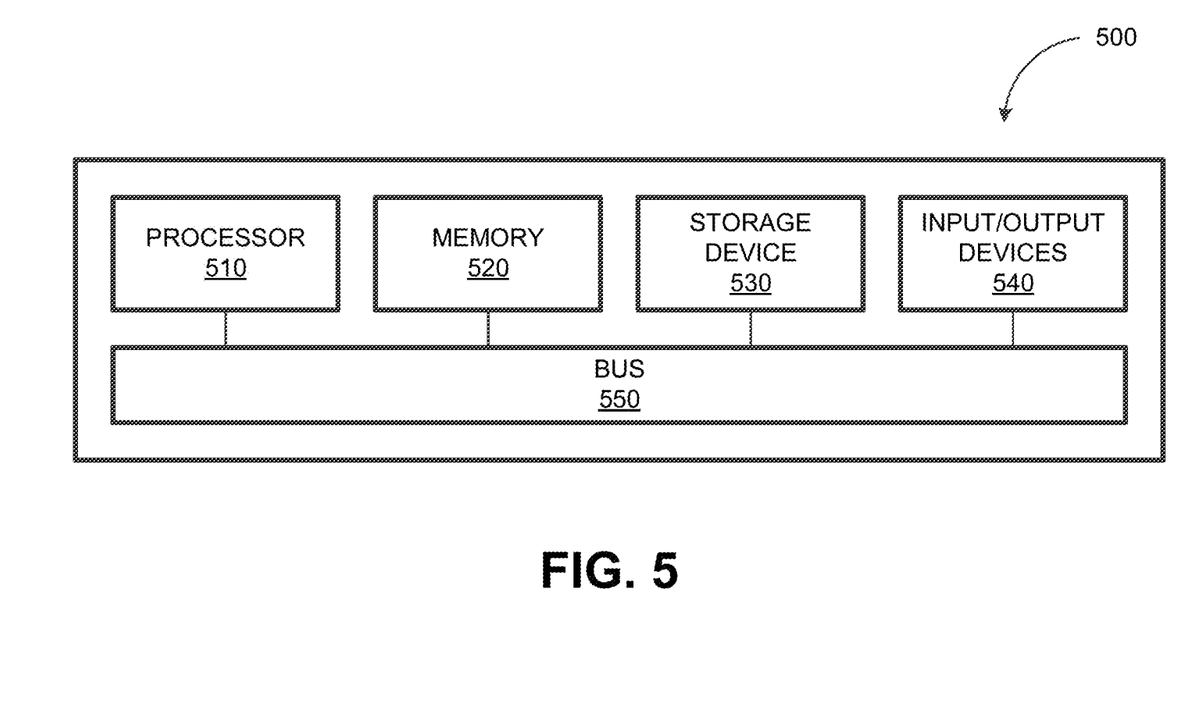
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the text analysis engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the text analysis engine 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
      training, based at least on a training data, a language determination model, the training data including a first performance of a first machine learning model analyzing text in a first language, a second language, and/or a third language, and the training data further including a second performance of a second machine learning model analyzing text in the first language, the second language, and/or the third language;
      applying the language determination model to select the first machine learning model instead of the second machine learning model to analyze an input text in the third language, the language determination model selecting the first machine learning model trained to analyze text in the first language based at least on the first machine learning model having a better performance analyzing text in the third language than the second machine learning model trained to analyze text in the second language; and
      analyzing the input text by at least applying, to the input text, the first machine leaning model.

2. The system of claim 1, wherein the training data further includes a family, a branch, a sub-branch, and/or a script associated with each of the first language, the second language, and the third language.

3. The system of claim 1, wherein each of the first performance and the second performance correspond to a quantity of named entities assigned to a correct category.

4. The system of claim 1, further comprising:
   updating, based at least on a third performance of the first machine learning model analyzing the input text, the language determination model.

5. The system of claim 4, further comprising:
   in response to the third performance of the first machine learning model analyzing the input text being below a threshold value, training, based on additional training data in the first language, the first machine learning model.

6. The system of claim 1, wherein the language determination model is further trained to select, based at least on a type of the input text, the first machine learning model or the second machine learning model to analyze the input text.

7. The system of claim 1, wherein the first machine learning model, the second machine learning model, and the language determination model each comprise a support vector machine, a boosted decision tree, a regularized logistic regression model, a neural network, and/or a random forest.

8. The system of claim 1, wherein the analysis of the input text includes assigning each named entity present in the input text to one or more categories including a person name, an organization, a location, a medical code, a time expression, a quantity, a monetary value, and a percentage.

9. A computer-implemented method, comprising:
   training, based at least on a training data, a language determination model, the training data including a first performance of a first machine learning model analyzing text in a first language, a second language, and/or a third language, and the training data further including a second performance of a second machine learning model analyzing text in the first language, the second language, and/or the third language;

applying the language determination model to select the first machine learning model instead of the second machine learning model to analyze an input text in the third language, the language determination model selecting the first machine learning model trained to analyze text in the first language based at least on the first machine learning model having a better performance analyzing text in the third language than the second machine learning model trained to analyze text in the second language; and analyzing the input text by at least applying, to the input text, the first machine leaning model.

10. The method of claim 9, wherein the training data further includes a family, a branch, a sub-branch, and/or a script associated with each of the first language, the second language, and the third language.

11. The method of claim 9, wherein each of the first performance and the second performance correspond to a quantity of named entities assigned to a correct category.

12. The method of claim 9, further comprising:

updating, based at least on a third performance of the first machine learning model analyzing the input text, the language determination model.

13. The method of claim 12, further comprising:

in response to the third performance of the first machine learning model analyzing the input text being below a threshold value, training, based on additional training data in the first language, the first machine learning model.

14. The method of claim 9, wherein the language determination model is further trained to select, based at least on a type of the input text, the first machine learning model or the second machine learning model to analyze the input text.

15. The method of claim 9, wherein the first machine learning model, the second machine learning model, and the language determination model each comprise a support vector machine, a boosted decision tree, a regularized logistic regression model, a neural network, and/or a random forest.

16. A non-transitory computer readable medium storing instructions, which when executed by at least one data processor, result in operations comprising:

training, based at least on a training data, a language determination model, the training data including a first performance of a first machine learning model analyzing text in a first language, a second language, and/or a third language, and the training data further including a second performance of a second machine learning model analyzing text in the first language, the second language, and/or the third language;

applying the language determination model to select the first machine learning model instead of the second machine learning model to analyze an input text in the third language, the language determination model selecting the first machine learning model trained to analyze text in the first language based at least on the first machine learning model having a better performance analyzing text in the third language than the second machine learning model trained to analyze text in the second language; and analyzing the input text by at least applying, to the input text, the first machine leaning model.

* * * * *